Oct. 8, 1963 W. D. KENNEY 3,106,255
TANDEM DISC HARROW
Filed April 7, 1961 2 Sheets-Sheet 1

INVENTOR.
William D. Kenney
BY

ATTORNEY

Oct. 8, 1963　　　W. D. KENNEY　　　3,106,255
TANDEM DISC HARROW

Filed April 7, 1961　　　　　　　2 Sheets-Sheet 2

INVENTOR.
William D. Kenney
BY

ATTORNEY

United States Patent Office 3,106,255
Patented Oct. 8, 1963

3,106,255
TANDEM DISC HARROW
William D. Kenney, Columbus, Ga., assignor, by mesne assignments, to Lilliston Implement Company, Albany, Ga., a corporation of Georgia
Filed Apr. 7, 1961, Ser. No. 101,521
7 Claims. (Cl. 172—568)

This invention relates to earth working implements and is more particularly concerned with a tandem disc harrow having adjustable gang assemblies on front and rear gangs and a selectively useable rear gang.

Implements of the general class here disclosed have been widely employed in the past and are generally known as "lift" type disc harrows. Such a "lift" type disc harrow is usually provided with a hitch or fastener which connects rigidly to a tractor, so that it may be raised and lowered by hydraulic pressure for the purpose of being transported by the tractor as well as for controlling the penetration of the disc. The lifting action necessitates that the implement's weight not exceed the capacity of the tractor to lift and control. Thus, comparatively light disc type harrows must usually be employed.

A relatively lightweight implement, however, does not readily penetrate the earth under the most difficult conditions since the weight of the implement adds force in urging the cutting disc blades into the soil. In order to provide a relatively lightweight harrow which is sufficiently versatile that the weight per blade may be concentrated, it is common practice to provide a tandem arrangement of the discs, so linked together that the weight of the rear disc gang may be placed over the front gang when such increase in the effective weight per disc is required to penetrate in the more firm ground. The prior art machines, therefore, have usually included a front gang and a rear gang joined together along a transverse axis whereby, through the loosening of bolts with wrenches or the removal of such bolts, the rear gang may be manually placed on top of the front gang to increase the effective weight of the front gang while decreasing the number of disc blades engaging the ground.

Since the conversion from a tandem disc arrangement to a front disc arrangement, as described above, requires considerable labor, it is very often true that an operator will forego the advantage of deeper penetration of the discs into the ground in order to save time and labor.

In order to overcome the disadvantages described above and yet provide a relatively lightweight tandem disc harrow which will more effectively utilize the weight of the harrow when a single disc gang operation is desired, I have devised a tandem disc harrow which includes a front frame provided with opposed complementary outwardly and forwardly extending front gang assemblies which may be simultaneously pivoted to adjust the angles of the disc blades, as desired. The central draw bar of the front frame receives a pivotable, coaxially disposed member from the rear gang which is readily rotatable through a 360° arc. The coaxially disposed member is preferably telescoped within the main portion of the central draw bar whereby coaxial alignment is maintained at all times. Radiating outwardly and rearwardly from the rear coaxial member are the rear gang assemblies which are pivotally supported for movement in a common plane. When the disc harrow of the present invention is lifted by a tractor, only a negligible amount of labor is required simply to rotate the rear gang 180° whereby it acts as a cantilever weight for the disc blades of the forward gang.

Accordingly, it is an object of the present invention to provide a tandem disc harrow in which the weight of the rear gang may be applied to the front gang and be converted back to its original condition when desired, with a minimum of manual effort.

Another object of the present invention is to provide a tandem disc harrow which, when it is desired to employ only the front gang for deep penetration, will more effectively apply the weight of the rear gang to the front gang.

Another object of the present invention is to provide a tandem disc harrow wherein the angles of the blades may be readily and easily adjusted.

Another object of the present invention is to provide a tandem disc harrow which is inexpensive to manufacture, durable in construction and efficient in operation.

Other objects, features and advantages of the present invention will become apparent from the following description when taken in conjunction with the accompanying drawings wherein like characters of reference designate corresponding parts throughout the several views, and wherein.

Figures 1, 2:
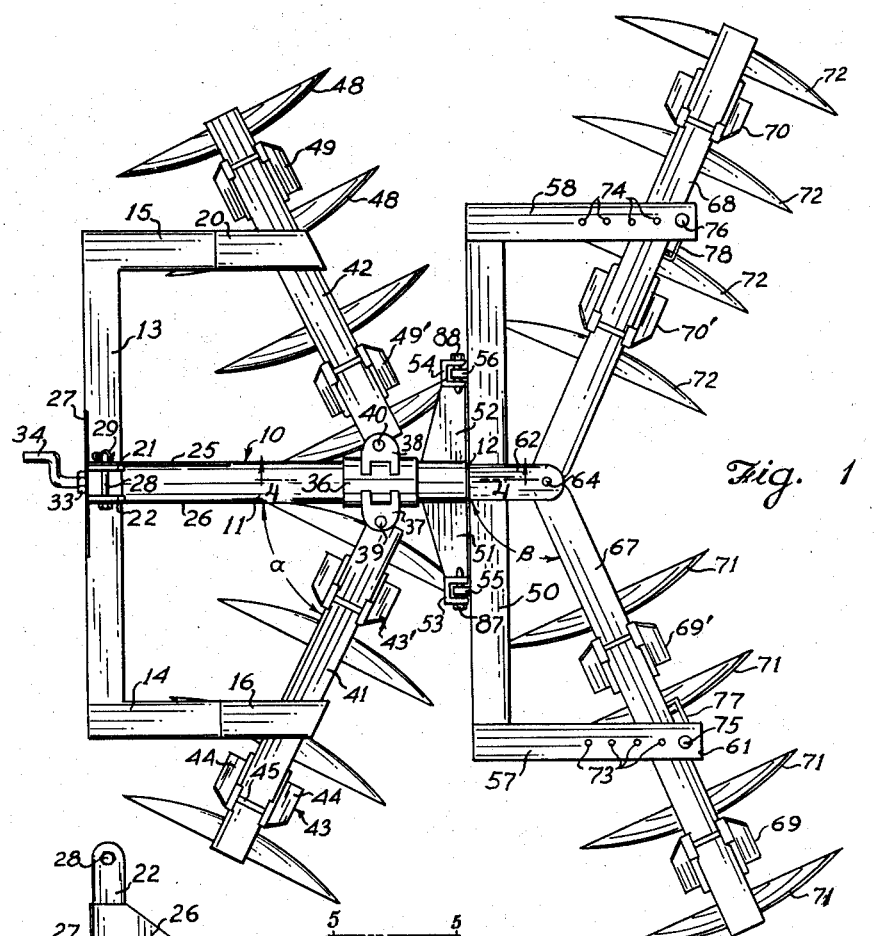
FIG. 1 is a plan view of a tandem disc harrow constructed in accordance with the present invention.
FIG. 2 is a partially broken, side elevational view of the tandem disc harrow shown in FIG. 1.

Referring now in detail to the embodiment chosen for the purpose of illustrating the present invention, it being understood that the invention in its broader aspects is not limited to the exact details herein depicted, numeral 10 denotes generally the central longitudinally disposed draw bar having a hollow cylindrical tubular front draw bar member 11, the rear end of which telescopically and rotatably receives a pivot member 12 of the rear draw bar member.

The front draw bar member 11 constitutes the central portion of a front gang frame which includes a yoke having a transversely disposed tow bar 13 rigidly joined by its central portion to the front end of the front draw bar member 11. The transversely disposed tow bar 13 is essentially perpendicular to and in the same horizontal plane with the front draw bar member 11 and extends outwardly on opposite sides of member 11.

Extending rearwardly from the ends of tow bar 13 and disposed parallel to and spaced from the central draw bar 10 are a pair of gang bar supporting arms or wings 14 and 15, respectively. Preferably, the transverse tow bar 13 and its rearwardly extending arms are hollow tubular members which are rectangular, e.g., square, in cross section so as to be relatively lightweight and yet sufficiently strong that they form a means by which the forward gang assemblies may be pulled along the surface of the ground, as will be described more fully hereinafter. Since the forward gang assemblies are inclined forwardly, the draw bar member 11 should be longer than arms 14 and 15.

At the rear end of the gang supporting arm 14 are a pair of gang bar supporting plates 16 and 17 disposed one over the other and secured to the upper and lower surfaces of arm 14 to provide a bifurcated, rearwardly extending, element protruding beyond the end of arm 14. The ends of plates 16 and 17 are cut at an angle and joined by an abutment plate 18 which angles inwardly and readwardly. It is, therefore, seen that the end of arm 15 and plates 16, 17 and 18 define a closed horizontal slot. Likewise, the end of arm 15 is provided with a complementary, closed, horizontal slot defined by a similar group of plates, including plate 20.

The front frame also includes a central three-point hitch by means of which the harrow is secured to the usual hydraulically controlled rods (not shown) extending rearwardly from a tractor. The hitch includes a pair of upstanding opposed flat parallel hitch elements 21 and 22, the lower ends of which are secured, as by welding, to the upper surface of the central draw bar member 11. Similar elements 23 and 24 protrude downwardly, in spaced parallel relationship, from the lower surface of the central draw bar member 11. Gussets 25 and 26, extending between the front draw bar member 11 and the upstanding elements 21 and 22 respectively, reinforce the elements 21 and 22. The elements 21 and 22 are, also, reinforced by a face plate 27 secured to the front edges of elements 21 and 22, and secured to the transverse tow bar 13.

The upper ends of elements 21 and 22 are provided with aligned holes which receive a transverse bolt 28, as illustrated in FIG. 1, the transverse bolt 28 being removably retained in place by a cotter pin 29. Bolt 28, therefore, provides a means by which the harrow may be pivotally secured to the end of the upper rod (not shown) of the tractor. The lower end portions of the elements 23 and 24 are provided with outwardly protruding pins, such as transverse pin 30, for pivotally connecting the harrow to the lower rods (not shown) of the tractor.

As seen in FIG. 2, above the pin 30 a transverse bearing plate 31 is secured between elements 23 and 24, through which passes a longitudinally extending crank shaft 32 provided with bearing collars or nuts 33, 33' on opposite sides of plate 31 and a crank handle 34. The collars 33, 33' bear against plate 31 and prevent forward and rearward movement of shaft 32, while permitting the shaft 32 to be freely rotated.

Figure 4:
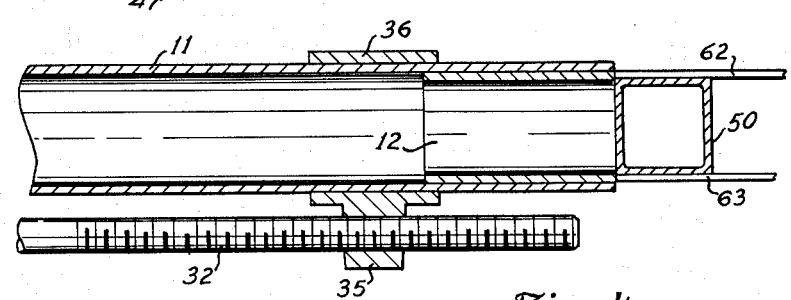
FIG. 4 is an enlarged cross sectional view taken along line 4—4 in FIG. 1.
Figure 5:
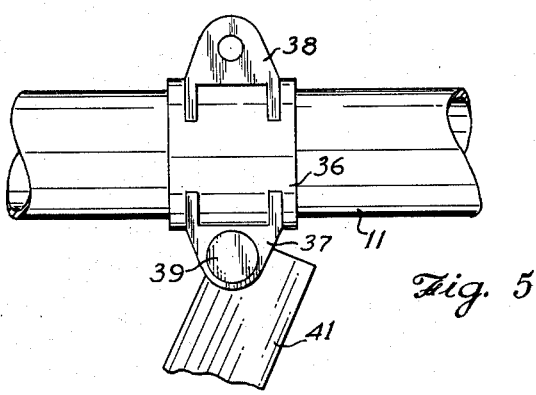
FIG. 5 is an enlarged plan view taken along line 5—5 in FIG. 2.

The shaft 32 protrudes rearwardly, parallel to and beneath the front draw bar member 11, and is externally threaded to threadedly engage a lug 35 depending from a sliding collar 36, as shown in FIG. 4. The collar 36 is slidably carried by the central draw bar member 11 and is adapted to be moved forwardly and rearwardly thereon upon manipulation of crank handle 34.

Protruding from opposite sides of the collar 36 are pairs of opposed horizontally disposed brackets, such as brackets 37 and 38, having vertically disposed, aligned holes which receive pivot pins 39 and 40. The pivot pins 39 and 40 respectively project through holes in the ends of forwardly and outwardly extending hollow rectangular tubular members or gang bars 41 and 42 respectively, these gang bars 41 and 42 constituting the supporting arms of the two front gang assemblies. As best seen in FIG. 1, intermediate portions of gang bars 41 and 42 are slidably received in the slots of arms 14 and 15.

It will now be seen that upon manipulation of the crank handle 34, the acute angle $\alpha$ subtended by the central draw bar member 11 and the gang bar 41 may be varied while simultaneously varying, by an equal amount, the angle between central draw bar member 11 and gang bar 42, the gang bars 41 and 42 sliding inwardly and outwardly within the slots of the arms 14 and 15.

On the gang bar 41 are a plurality, e.g. two, of spaced disc blade supporting brackets 43, 43', each having a pair of downwardly extending legs 44 which at their upper ends sandwich the bar 41 and are held in place by bolts 45. The lower ends of each pair of brackets 43, 43' are provided with a common shaft 46 rotatably retaining a plurality of coaxially aligned spaced disc blades 47.

Normally, the axis of rotation of each gang of disc blades 47 is parallel to and below the gang bar to which it is connected, the disc blades 47 being concaved and facing outwardly and slightly forwardly. Shaft 46 is thus normally parallel to and below arm 41; however, the shaft 46 and therefore the disc blades 47 may be moved inwardly and outwardly in an axial direction by adjusting the position of brackets 43, 43' on gang bar 41.

Similarly, the gang bar 42 is provided with gang assemblies including disc blades 48 and brackets 49, 49' symmetrically positioned below gang bar 42.

Referring now to the tandem arranged rear gang, its rear gang frame includes a yoke similar in shape to the front yoke. In more detail, the rear yoke includes a rectangular, tubular transverse tow bar 50 secured by its midsection to the rear end of a cylindrical pivot member 12 which protrudes within and is journalled by the rear end portion of forward draw bar member 11. Tow bar 50, normally, abuts the rear end of draw bar member 11, the draw bar member 11 being provided with diametrically opposed, horizontally disposed wing plates 51 and 52. At the outer ends of plates 51 and 52 are complementary hasps 53 and 54 which receive the staples 55 and 56 which project forwardly from the tow bar 50. Aligned, horizontally disposed bolts 87 and 88 removably pass through the hasps 53 and 54 and releasably secure the staples 55 and 56 in place so as to transmit force from the front draw bar member 11 to the rear tow bar 50.

Extending rearwardly from the opposed ends to the tow bar 50 are the gang bar supporting arms 57 and 58. As best seen in FIG. 2, gang supporting arm 57 includes a pair of flat metal bars 59 and 60 which provide a rather long horizontal slot closed at its rear end by a block 61. Similarly, arm 58 is formed of plates to provide a complementary slot.

Aligned with the pivot member 12 so as to form part of the rear draw bar member and protruding rearwardly from the mid portion of tow bar 50 are a pair of spaced parallel complementary plates 62 and 63, the upper plate 62 being secured by its forward end portion to the upper surface of tow bar 50, and the lower plate 63 being secured by its forward end portion to the lower surface of tow bar 50, as shown in FIG. 4. The rear end portions of plates 62 and 63 are rounded and provided with vertically aligned holes which receive a pivot pin 64.

Pivotally mounted on the pin 64 are pairs of flat overlapping brackets, such as brackets 65 and 66, which respectively connect to the inner ends of diverging, outwardly and rearwardly extending gang bars 67 and 68 which, in turn, respectively extend through and beyond the closed slots in arms 57 and 58 forming obtuse angles, such as angle $\beta$, with the rear draw bar member.

On the gang bars 67 and 68 are the gang assemblies including brackets 69, 69', 70, 70' and disc blades 71 and 72 respectively. The gang assemblies are essentially the same for all gang bars. Thus, the gang assemblies here discussed are similar to the forward gang assemblies described above.

In FIG. 1 it will be seen that arms 57 and 58 are provided with a plurality of axially spaced vertical holes 73 and 74 which selectively receive locking pins 75 and 76, the locking pins 75 and 76 being adapted to project through slots formed by U-shaped straps 77 and 78 on the rear sides of gang bars 67 and 68, respectively.

The operation of the embodiment described above is as follows: The tandem disc harrow heretofore described is connected to the hydraulically controlled upper and lower arms (not shown) of the tractor by means of bolts 28 and pins 30 so that it may be pulled along behind the tractor over an open field to be cultivated.

With the conventional three-point hitch described above, the harrow may be lifted from and lowered to the ground by the tractor in cantilever fashion.

The angular adjustment of the front gang assemblies is obtained by turning crank handle 34 of shaft 32 which slides collar 36 along the front draw bar 11, thereby pivoting gang bars 41 and 42 which varies the angle $\alpha$.

Angular adjustment of the rear gang assemblies is obtained by removing locking pins 75 and 76 and moving the gang bars 67 and 68 so as to align the slots of straps 77 and 78 with the selected holes 73 and 74. The pins 75 and 76 are, then, inserted through the holes 73 and 74 respectively.

When it is desired to use both the forward and rear gang assemblies, the harrow is lowered by the hydraulic system of the tractor and pulled along the ground. With the concaved disc blades 47 and 48 of the front gang assemblies facing slightly forwardly, they move the soil outwardly upon forward motion of the tractor. The concaved disc blades 71 and 72 facing slightly rearwardly move the soil back inwardly toward the center soon after it has been moved outwardly by the front gangs. This gives a double movement of the soil by the front and rear disc blades and thus provides a better pulverized soil area.

Figure 3:
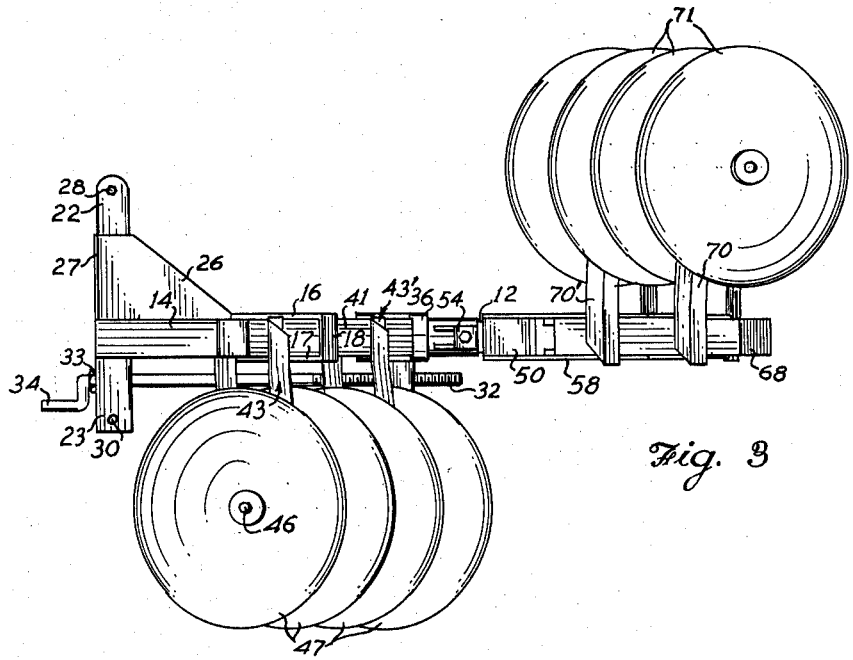
FIG. 3 is a view similar to FIG. 2, showing the rear gang in its inverted position.

When, however, hard ground is approached by the tractor, of if deeper penetration of ground by the disc is desired and cannot be achieved by hydraulic pressure from the tractor, the harrow is lifted and the bolts 87 and 88 removed. Thereafter, the rear gang is manually rotated 180°, pivoting on its pivot member 12 until the staples 55 and 56 are again aligned with the hasps 53 and 54. The bolts 87 and 88 are then replaced and the harrow lowered by the tractor into cutting engagement with the soil, the parts of the harrow being in essentially the condition shown in FIG. 3, whereby the rear gang acts as a cantilever weight having a large moment arm to apply force to the front disc blades 47 and 58 having a small moment arm. Thus, not only are the rear blades 71 and 72 removed from contact with the ground but a very substantial increase in effective weight or mechanical advantage is achieved over that which would be applied if the rear gang were arranged directly over the front gang.

It will be obvious to those skilled in the art that many variations may be made in the embodiment chosen for the purpose of illustrating the present invention without departing from the scope thereof as defined by the appended claims.

I claim:

1. In a tandem disc harrow of the type having a hitch by which the harrow may be pulled in a longitudinal direction and lifted and lowered about a transverse axis in cantilever fashion by a tractor to which said harrow is attached, the combination therewith of a front frame connected to said hitch and extending in said longitudinal direction from said hitch, front gang assemblies connected to said front frame and including front blades for engagement with the ground when said harrow is lowered by said tractor, a rear frame, said front frame and said rear frame having interengaging elements for pivotally connecting said rear frame to said front frame for free rotation about an axis disposed in said longitudinal direction, and rear gang assemblies carried by said rear frame, said rear gang assemblies including rear blades engageable with the ground in one predetermined position of said rear frame and when said harrow is lowered, said rear blades being movable by said rear frame from their ground engaging position to a position free from the ground upon rotation of said rear frame to another predetermined position.

2. In a tandem disc harrow of the type having a hitch by which the harrow may be lifted and lowered in cantilever fashion by a tractor to which said harrow is attached, the combination therewith of a front frame connected to said hitch and including a front transverse tow bar, front gang bar supporting arms extending rearwardly from the ends of said transverse tow bar, a central longitudinally extending draw bar member connected to the midportion of said front tow bar and extending rearwardly therefrom in parallel relationship to said arms, a pair of gang bars connected by their inner ends to said draw bar, intermediate portions of said gang bars being connected to said arms, gang assemblies carried by said gang bars, said gang assemblies including front blades engageable with the ground when said harrow is lowered by said tractor, a rear frame having an element pivotally connected to said central draw bar member for free rotation about the longitudinal axis with respect of said central draw bar member, said rear frame including a rear transverse tow bar, a pair of rear gang bar supporting arms extending rearwardly from the ends of said rear tow bar, a pair of diverging rear gang bars connected to the central portion of said rear tow bar, said rear gang bar supporting arms carrying intermediate portions of said rear gang bars, and rear gang assemblies carried by said gang bars, said rear gang assemblies including rear blades engageable with the ground in one predetermined position of said rear frame and when said harrow is lowered, said rear blades being movable by said rear frame from their ground engaging position to a position free from the ground upon pivoting of said rear frame to another predetermined position.

3. In a tandem disc harrow of the type having a hitch by which the harrow may be lifted and lowered in cantilever fashion by a tractor to which said harrow is attached, the combination therewith of a front frame connected to said hitch and including a front transverse tow bar, front gang bar supporting arms extending rearwardly from the ends of said transverse tow bar, a central longitudinally extending tubular cylindrical draw bar member connected to the midportion of said front tow bar and extending rearwardly therefrom in parallel relationship to said arms, a collar slidably carried by said draw bar member and movable with respect thereto, means for adjusting the position of said collar with respect to said draw bar member, a pair of gang bars each pivotally connected by one end to said collar, intermediate portions of said gang bars slidably engaging the end portions of said arms and projecting outwardly therebeyond, gang assemblies carried by said gang bars, said gang assemblies including front disc blades engageable with the ground when said harrow is lowered by said tractor, a rear frame having a longitudinally extending pivot member projecting forwardly into the rear end of said draw bar member for pivotally connecting said rear frame to said central draw bar member for free rotation of said rear frame about the longitudinal axis of said central draw bar member, locking means for locking said rear frame in predetermined positions with respect to said central draw bar member, said rear frame including a rear transverse tow bar, a pair of rear gang bar supporting arms extending rearwardly from the ends of said rear tow bar, a pair of diverging rear gang bars pivotally connected to the central portion of said rear tow bar, said rear gang bar supporting arms adjustably carrying intermediate portions of said rear gang bars, and rear gang assemblies carried by said gang bars, said rear gang assemblies including rear disc blades engageable with the ground in one predetermined position of said rear frame and when said harrow is lowered, said rear disc blades being movable by said rear frame from their ground engaging position to a position free from the ground upon pivoting of said rear frame to another predetermined position.

4. In a tandem disc harrow, forward and rear tandem arranged frames having blades engageable with the ground, hitch means on said front frame by means of which said frame may be lifted in cantilever fashion by a tractor, one of said frames including a central longitudinally extending draw bar member pivotally connected to the other of said frames for free rotation about its axis through 180° with respect to said other of said frames so as to carry the blades of said rear frame from its position in engagement with the ground to an inverted position behind and supported by said front frame.

5. In a tandem disc harrow having forward and rear frames, hitch means on said front frame by means of which said frame may be lifted in cantilever fashion by a tractor, a longitudinally extending draw bar connecting the central portions of said frames, said draw bar including a pair of cylindrical draw bar members telescopically connected together, the ends of said members being respectively rigidly connected to said frames whereby said rear frame may be lifted upon tilting of said front frame and may be freely rotated about the longitudinal axis of said frames when in its lifted position.

6. In a tandem disc harrow having forward and rear frames, hitch means on said front frame by means of which said frame may be lifted in cantilever fashion by a tractor, a longitudinally extending draw bar connecting the central portions of said frames, said draw bar including a pair of cylindrical draw bar members telescopically connected together, the ends of said members being respectively rigidly connected to said frames whereby said rear frame may be lifted upon tilting of said front frame and may be freely rotated about the longitudinal axis of said frames when in its lifted position, and means for locking said front and rear frames in alignment with each other.

7. In a tandem disc harrow having forward and rear frames, hitch means on said front frame by means of which said frame may be lifted in cantilever fashion by a tractor, a longitudinally extending draw bar connected between the aforesaid frames, said draw bar including a pair of coaxially aligned tubular members, one received within the end of the other for permitting rotation of said rear frame about the longitudinal axis of said draw bar, adjustable gang assemblies carried by both of said frames, and linking means for transmitting force from said front frame to said rear frame when said rear frame is aligned with said front frame and said gang assemblies are engaging the ground.

References Cited in the file of this patent
UNITED STATES PATENTS

| | | |
|---|---|---|
| 1,167,912 | Matofij | Jan. 11, 1916 |
| 2,676,524 | Bashor | Apr. 27, 1954 |
| 2,755,613 | Oehler et al. | July 24, 1956 |
| 2,881,578 | Oehler et al. | Apr. 14, 1959 |
| 2,897,905 | McClesky | Aug. 4, 1959 |